US008950191B2

(12) United States Patent
Landis et al.

(10) Patent No.: US 8,950,191 B2
(45) Date of Patent: Feb. 10, 2015

(54) SYSTEM AND METHOD FOR GAS TURBINE CHILLED WATER STORAGE DISCHARGE CONTROL AND/OR GAS TURBINE OUTPUT CONTROL

(75) Inventors: Frank Landis, Erie, CO (US); James Nolan, Boulder, CO (US)

(73) Assignee: Bicent Power LLC, Easton, MD (US)

( * ) Notice: Subject to any disclaimer, the term of this patent is extended or adjusted under 35 U.S.C. 154(b) by 1183 days.

(21) Appl. No.: 12/822,016

(22) Filed: Jun. 23, 2010

(65) Prior Publication Data

US 2011/0001324 A1 Jan. 6, 2011

Related U.S. Application Data

(60) Provisional application No. 61/222,800, filed on Jul. 2, 2009.

(51) Int. Cl.
| | |
|---|---|
| *F02C 3/30* | (2006.01) |
| *F02C 7/12* | (2006.01) |
| *F02G 1/047* | (2006.01) |
| *F02C 9/16* | (2006.01) |
| *F02C 7/143* | (2006.01) |
| *F02C 9/00* | (2006.01) |
| *F02K 99/00* | (2009.01) |

(52) U.S. Cl.
CPC ........... *F02C 7/143* (2013.01); *F05D 2270/053* (2013.01)
USPC ............. 60/775; 60/773; 60/39.26; 60/39.48; 60/39.3; 60/39.53; 60/39.59; 60/39.83; 137/15.1; 137/15.2

(58) Field of Classification Search
USPC ............... 60/267, 773, 775, 793, 39.26, 39.3, 60/39.48, 39.53, 39.54, 39.59, 39.83; 137/15.1, 15.2
See application file for complete search history.

(56) References Cited

U.S. PATENT DOCUMENTS

| | | | | |
|---|---|---|---|---|
| 4,418,527 | A | * 12/1983 | Schlom et al. | .................. 60/775 |
| 4,897,551 | A | * 1/1990 | Gersh et al. | ................. 250/461.1 |
| 5,381,860 | A | 1/1995 | Mather | |
| 5,465,585 | A | 11/1995 | Mornhed et al. | |
| 6,318,065 | B1 | * 11/2001 | Pierson | ........................... 60/783 |
| 6,318,066 | B1 | 11/2001 | Skowronski | |
| 6,470,686 | B2 | * 10/2002 | Pierson | ........................... 60/772 |
| 6,647,763 | B1 | 11/2003 | Smith | |
| 7,287,381 | B1 | * 10/2007 | Pierson et al. | .................. 60/651 |
| 7,343,746 | B2 | * 3/2008 | Pierson | ........................... 60/772 |

(Continued)

OTHER PUBLICATIONS

Sebzali, M., "Assessment of Cool Thermal Storage Strategies in Kuwait" Ph.D. Thesis, Cranfield University, School of Engineering, Academic Year 2007.

*Primary Examiner* — Ehud Gartenberg
*Assistant Examiner* — Karthik Subramanian
(74) *Attorney, Agent, or Firm* — Allan W. Watts; Bryan Cave LLP

(57) ABSTRACT

Variable speed drive controlled discharge pumps are used for pumping chilled water from a chilled water storage tank to coils operatively associated with the air inlet of a gas turbine, wherein the gas turbine is used to generate electricity. Use of the variable speed drive controlled discharge pumps aids is protecting the temperature distribution in the chilled water storage tank so that a thermocline rises with the addition of chilled water during charging of the tank with chilled water, and lowers during discharge of the tank when using the chilled water to cool inlet air at one or more gas turbines operated at a facility.

20 Claims, 10 Drawing Sheets

(56) References Cited

U.S. PATENT DOCUMENTS

| | | |
|---|---|---|
| 7,428,818 B2 | 9/2008 | Hjerpe |
| 7,478,561 B2 | 1/2009 | Auclair et al. |
| 2002/0007663 A1* | 1/2002 | Scaringe et al. ............... 73/40.7 |
| 2002/0112527 A1* | 8/2002 | Nadin ............................ 73/49.2 |
| 2006/0218931 A1* | 10/2006 | Haertel et al. .................. 60/775 |
| 2006/0266976 A1* | 11/2006 | Minor et al. .................... 252/68 |
| 2008/0041792 A1* | 2/2008 | Crnkovich et al. ........... 210/739 |

* cited by examiner

SYSTEM AND METHOD FOR GAS TURBINE CHILLED WATER STORAGE DISCHARGE CONTROL AND/OR GAS TURBINE OUTPUT CONTROL

CROSS REFERENCE TO RELATED APPLICATIONS

The present application claims the benefit of U.S. Provisional Patent Application No. 61/222,800 filed on Jul. 2, 2009, which is expressly incorporated herein by reference.

FIELD

The present invention relates to energy production, and more particularly, to a system and method for storing and delivering chilled water to an air inlet for energy generating equipment.

BACKGROUND

An increasing number of power generation plants are being designed and constructed to meet the ever increasing demand for electrical power. One type of power plant uses gas turbines to generate electricity.

One way of increasing the power output of a gas turbine is to cool the inlet air fed to the gas turbine. Cooling causes the air to have a higher density, thereby creating a higher mass flow rate through the turbine. The higher the mass flow rate through the turbine, the more power the turbine produces. Cooling the turbine inlet air temperature also increases the turbine's efficiency.

A number of systems can be used to chill the inlet air to a gas turbine. One such system uses a chiller to chill water that is then pumped through a coil. The inlet air is passed over the coil to cool the air. Some plants generate chilled water concurrently with its use. That is, the chilled water is conveyed directly from the chiller to the coil to cool the air at the air inlet to the gas turbine. Alternatively, cool water may be produced at night when electricity demand is relatively low, and thus less expensive, and used during the day when electricity demand is relatively high, and thus more expensive. To store the cool water generated at night, a chilled water storage tank may be used, wherein the storage tank is sized to provide a sufficient quantity of chilled water for gas turbine operations during peak demand hours.

One problem associated with use of a chilled water storage tank is mixing of water within the tank such that the temperature variation of water within the tank is not maintained. That is, it is desirable to maintain variation of water temperatures in the storage tank so that colder water can be used in preference to water having a higher temperature if mixing of the water occurred. Thus, there is need for improving the stratification of cold water from warm water within the chilled water storage tank, particularly while discharging from the chilled water storage tank.

Another problem with energy production is that electricity providers are faced with variable demand. More particularly, if power generation does not immediately respond to closely match the electrical demand, then current fluctuations as well as surges and/or outages can occur with detrimental results. Accordingly, there is a need for methods and systems that assist in quickly changing power generation to match electrical demand.

Yet another problem exists for determining whether coils carrying cooling liquid, such as chilled water, are leaking. If the coils are leaking, the addition of the liquid vapors to the air that feeds the gas turbine could detrimentally influence one or more elements associated with the gas turbines. Accordingly, there is a need for methods and systems that assist in monitoring leakage of liquid from the coils associated with the air inlets to the gas turbines. The present disclosure addresses these and other needs.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of other embodiments.

At least one embodiment of the one or more present inventions includes use of a controller and discharge pumps for providing variable speed drive pumping of chilled water from a chilled water storage tank to coils operatively associated with the air inlet of a gas turbine used to generate electricity. Such an approach enables a power plant to create chilled water during the low-demand off-peak hours from multiple generation resources, including fossil fuels and renewables, when there is often surplus energy available. The chilled water is stored in a tank and is then used to facilitate chilling of the inlet air to the gas turbines during high-demand peak hours when the ambient air temperature is high and ambient air quality is generally poorest. This makes the gas turbines more efficient and allows them to generate more electricity at peak-demand with less fuel and fewer carbon emissions than the plant would otherwise be capable. Conceptually, the chilled water system is similar to a battery or pumped storage system where power is generated during off-peak, low-cost hours, stored, and later used at peak-demand to the thermal advantage of the plant and the grid.

Various components are referred to herein as "operably associated." As used herein, "operably associated" refers to components that are linked together in operable fashion, and encompasses embodiments in which components are linked directly, as well as embodiments in which additional components are placed between the two linked components. "Operably associated" components can be "fluidly associated." "Fluidly associated" or "in fluid communication" refers to components that are linked together such that fluid can be transported between them. "Fluidly associated" can also encompass embodiments in which additional components are disposed between the two fluidly associated components, as well as components that are directly connected. Fluidly associated components can include components that do not contact fluid, but contact other components to manipulate the system (e.g., a pump that pumps a fluid through piping).

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the present invention, a more particular description of the invention is rendered by reference to specific embodiments thereof which are illustrated in the appended drawings. It is appreciated that these drawings depict only typical embodiments of the invention and are therefore not to be considered limiting of its scope. The invention is described and explained with additional specificity and detail through the use of the accompanying drawings in which.

The drawings are not to scale.

DETAILED DESCRIPTION

One or more embodiments described herein are directed to a system and/or method for discharging cool water from a chilled water storage tank to a coil for chilling inlet air fed to a gas turbine. In addition, one or more embodiments described herein may be used to help meet variable load conditions needed to meet the power demand within the electrical power grid.

Variable Speed Drive Controlled Discharge Pumps

Figure 1:
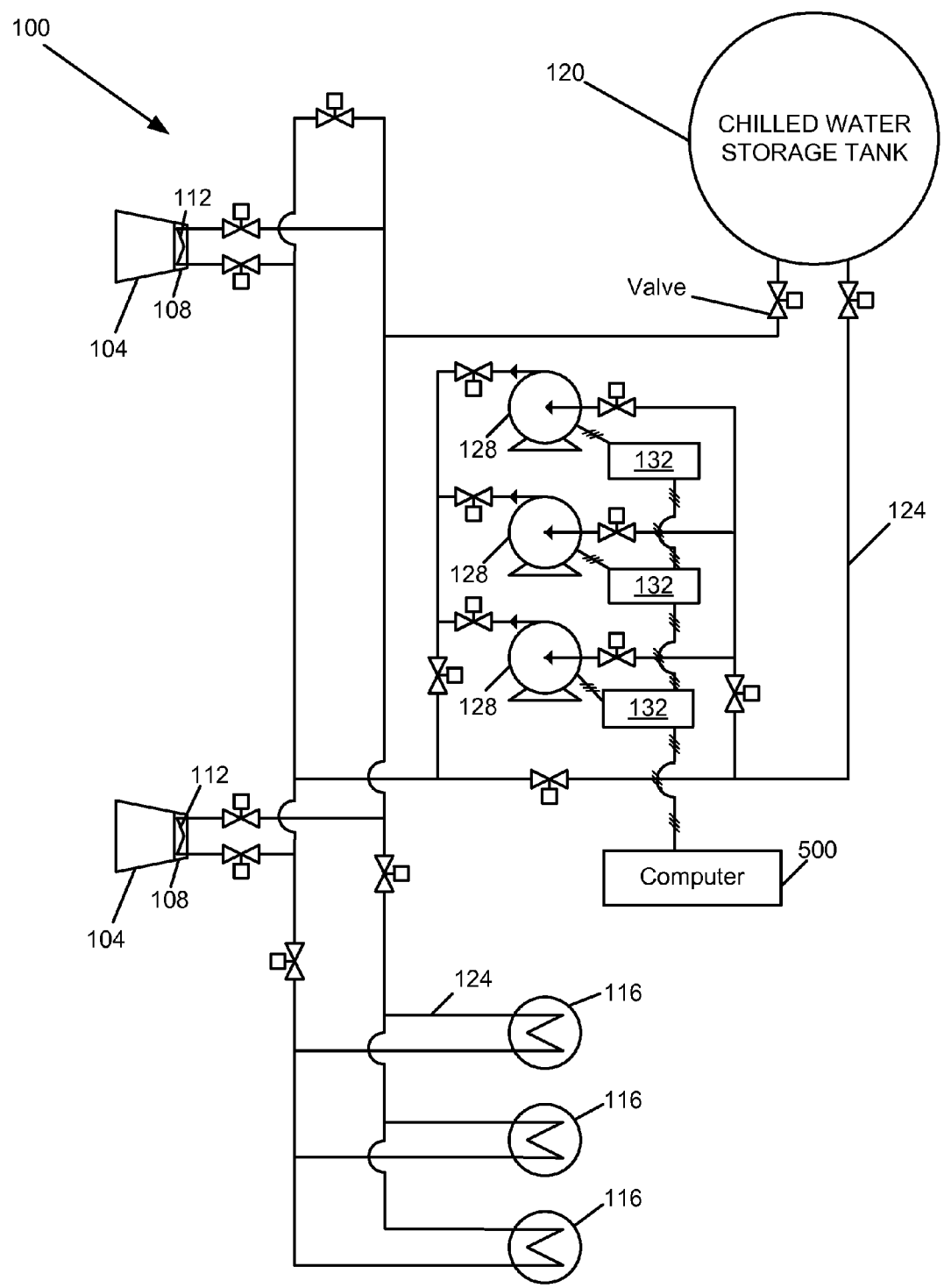
FIG. 1 is a schematic drawing that includes elements of at least one embodiment described herein.

Referring now to FIG. 1, and in accordance with at least one embodiment of the one or more present inventions, a gas turbine power generation system 100 is shown. The gas turbine power generation system 100 includes one or more gas turbines 104. The gas turbines include an air inlet 108. As those skilled in the art will appreciate, air filters may be used at the air inlet 108. The air inlet further includes one or more coils 112, wherein air is passed over the coils 112 to change the temperature of the inlet air.

Referring still to FIG. 1, one or more chillers 116 may be used to generate chilled water for passing through the coils 112. The chilled water may be conveyed directly to the coils 112 at the air inlet 108 of the turbines 104. Alternatively, the chillers 116 may be used to chill water that is first conveyed to at least one storage vessel, such as a chilled water storage tank 120 shown in FIG. 1. In at least one embodiment, the chillers 116 include a pump for pumping the water to and from the chilled water storage tank 120.

By way of example and not limitation, a typical operation cycle for a chilled water storage system of a gas turbine power plant includes a first period for generating cold water (also referred to herein as "charging"), and a second period for using the cold water (also referred to herein as "discharging"). Charging typically occurs during off-peak electrical demand hours, such as at night time and during the morning, to chill water and convey the chilled water via piping 124 to the chilled water storage tank 120. Discharging typically occurs during peak-demand hours, such as during the afternoon and early evening, and includes use of one or more discharge pumps 128 to pump water from near the bottom of the chilled water storage tank 120 to the coils 112 associated with the air inlets 108 of the gas turbines 104, and then back to the top of the chilled water storage tank 120. The charging and discharging portions of the operation cycle are discussed in further detail below.

During daily operation of the gas turbines 104, periods of time may pass wherein water is not being pumped from the chilled water storage tank 120 to either the coils 112 or the chillers 116. During such periods, the water within the chilled water storage tank 120 is not being disturbed by pumping. However, once pumping is started, then the influences (e.g., surging, water hammer, and mixing) within the chilled water storage tank 120 caused by turning on the pumps can occur, and the use the variable speed drive pumping system described herein is designed to mitigate disturbances to the temperature gradient and thermocline residing within the chilled water storage tank 120.

Figure 2:
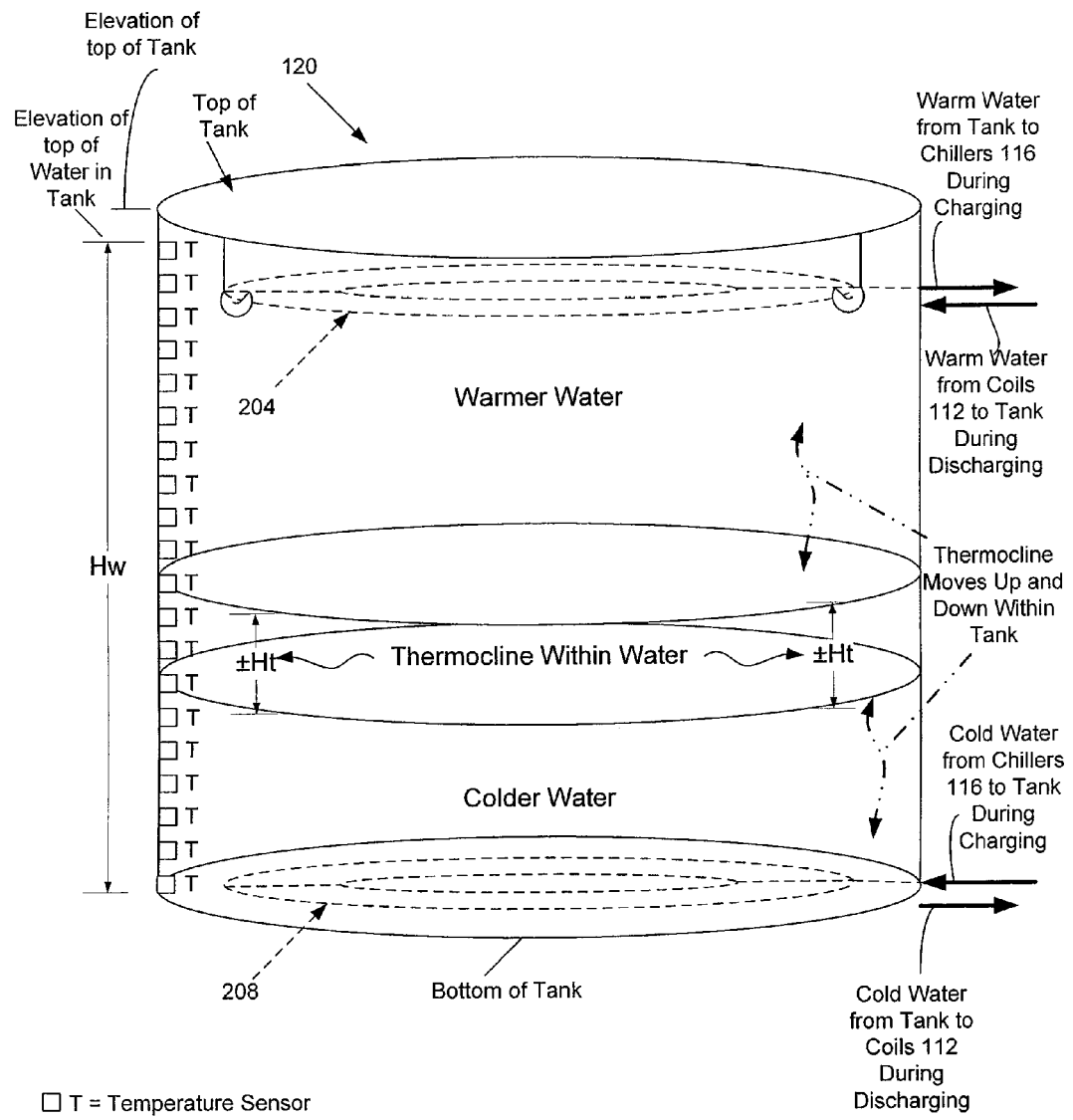
FIG. 2 is a side representation of a chilled water storage tank in accordance with at least one embodiment described herein.
Figure 3:
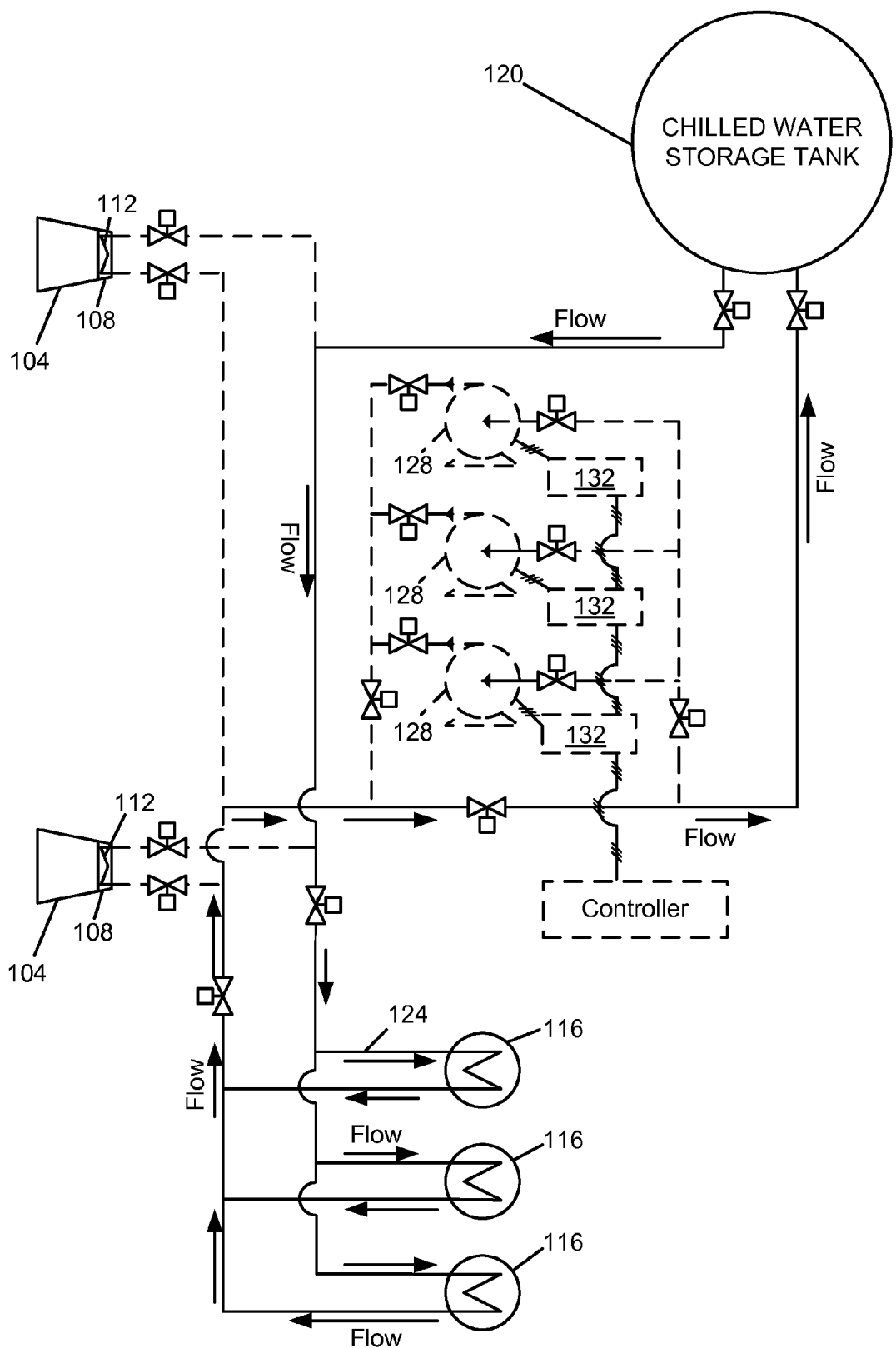
FIG. 3 is a schematic drawing of the embodiment of FIG. 1 with the system in charging mode, wherein elements used in the charging mode are depicted as solid lines and dashed lines represent elements not being used in the charging mode.

With reference now to FIGS. 2 and 3, during the charging portion of the operation cycle, relatively warm water is pumped out of the chilled water storage tank 120 and cold water is pumped into the chilled water storage tank 120. More particularly, the chilled water system is a closed system wherein water within the chilled water storage tank 120 and piping 124 is continuously recycled. Accordingly, relatively warm water is pumped from the chilled water storage tank 120 to the chillers 116 via top diffuser piping 204 located near the top of the chilled water storage tank 120. During charging, chilled water from the chillers 116 enters the chilled water storage tank 120 near the bottom of the chilled water storage tank 120 via bottom diffuser piping 208. By way of example and not limitation, the temperature of chilled water pumped from the chillers 116 to the chilled water storage tank 120 may be approximately 40 to 43° F. The diffuser piping within the chilled water storage tank 120, including the top diffuser piping 204 and the bottom diffuser piping 208, is typically slotted piping configured in a ring or octagonal layout and serves to disperse water within the tank 120 to mitigate mixing of water within the tank 120. That is, the diffuser piping 204 and 208 allows water to enter and exit the chilled water storage tank 120 at relatively low velocities. At the end of the charging mode, the chilled water storage tank 120 contains water having an average temperature that is less than the average temperature of the water held in the tank 120 at the beginning of the charging mode.

Figure 4:
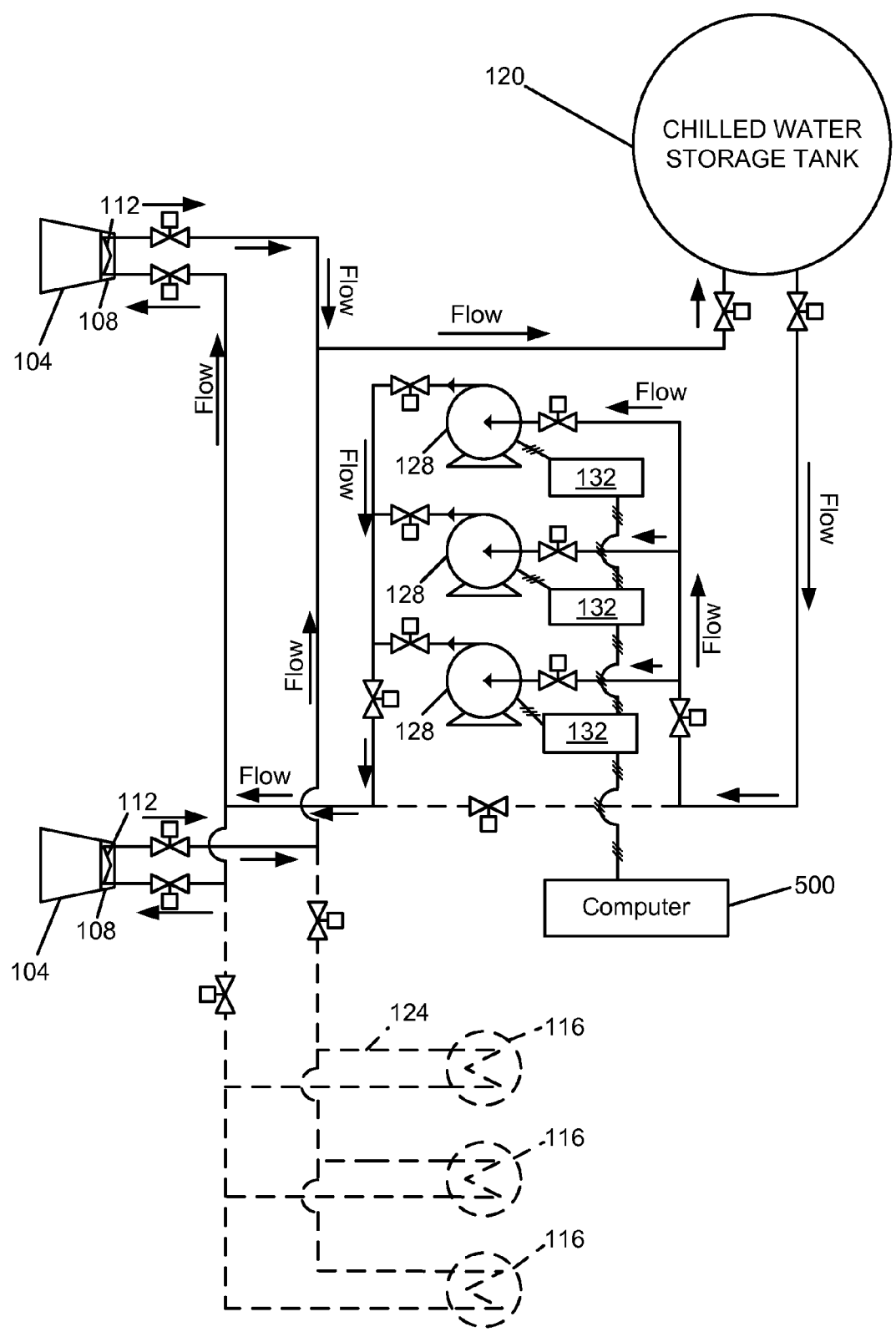
FIG. 4 is a schematic drawing of the embodiment of FIG. 1 with the system in discharging mode, wherein elements used in the discharging mode are depicted as solid lines and dashed lines represent elements not being used in the discharging mode.

Referring now to FIGS. 2 and 4, during the discharging portion of the operation cycle, cold water is pumped out of the chilled water storage tank 120 to the coils 112 at the air inlets 108 of the gas turbines 104, and warm water is pumped from the coils 112 back into the chilled water storage tank 120. More particularly, relatively cold water is pumped from the chilled water storage tank 120 to the coils 112 via the bottom diffuser piping 208 located near the bottom of the chilled water storage tank 120. By way of example and not limitation, the temperature of chilled water pumped from the chilled water storage tank 120 to the coils 112 may be approximately 40 to 45° F. Then after cooling the inlet air, relatively warm water from the downstream end of the coils 112 returns to the chilled water storage tank 120 near the top of the chilled water storage tank 120 via top diffuser piping 204. By way of example and not limitation, the temperature of water pumped from the downstream end of the coils 112 to the chilled water storage tank 120 may be approximately 55 to 60° F. At the end of the discharging mode, the chilled water storage tank 120 contains water having an average temperature that is greater than the average temperature of the water held in the tank 120 at the beginning of the discharging mode.

Figure 5:
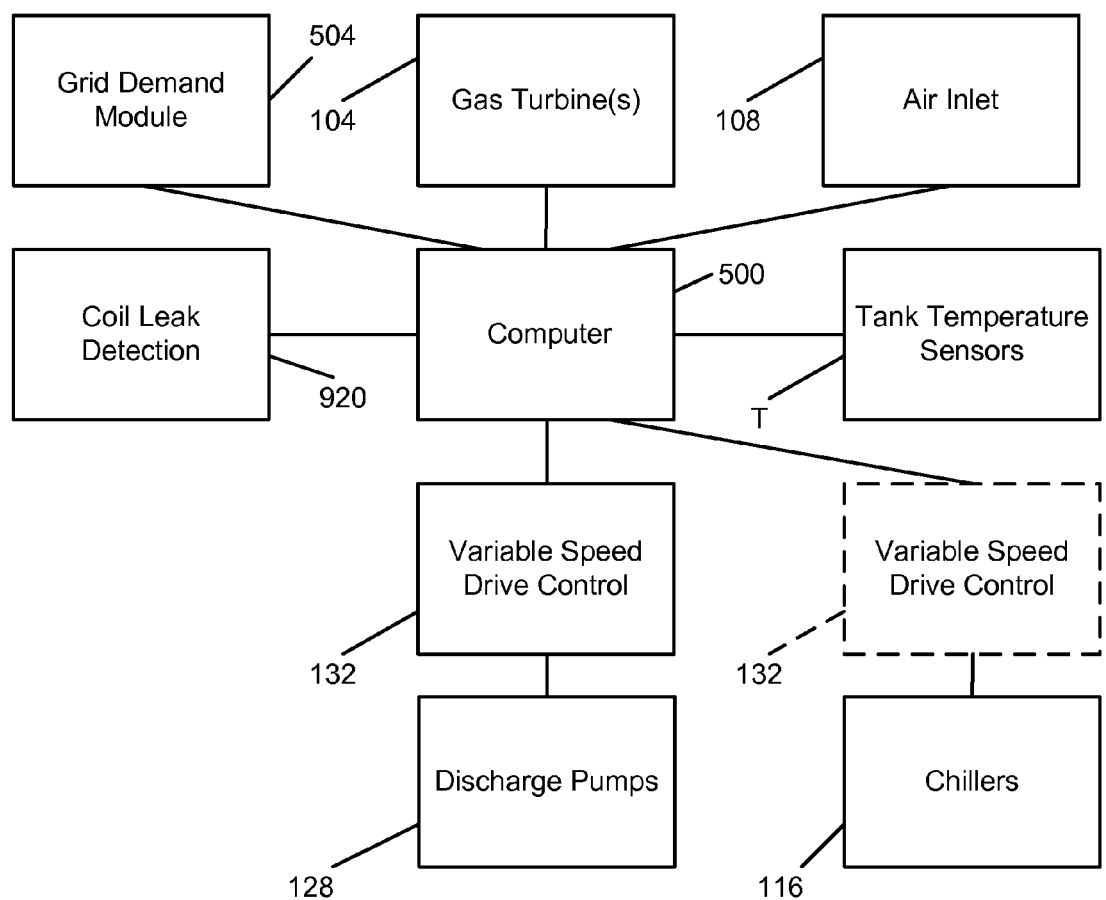
FIG. 5 is a box diagram of elements of the control system for one or more embodiments described herein, the control system including a computer associated with a variety of system elements.

With reference now to FIG. 5, in at least one embodiment, the discharge pumps 128 are controlled by a variable speed drive controller 132 that may be further controlled by a computer 500. More particularly, the variable speed drive controller 132 is used to slowly start the discharge pumps 128. The variable speed drive controller 132 (also known as a variable frequency drive) is a system for controlling the rotational speed of a pump, such as the discharge pumps 128, by adjusting the frequency of the electrical power supplied to the motors of the pump to which it controls, again, such as the discharge pumps 128. By slowly starting the discharge pumps 128, the vertical temperature gradient within the chilled water storage tank 120 is substantially maintained. By way of example and not limitation, the discharge pumps 128 are both started (and stopped) relatively slowly, such as over a period of approximately 15 seconds. Thus, the thermocline, having a vertical dimension Ht, existing within the chilled water storage tank 120 is substantially preserved, thereby allowing the cycling of chilled water from the bottom of the chilled water storage tank 120, to the coils 112, and then back to the top of the chilled water storage tank 120 without significantly mixing the water within the chilled water storage tank 120. As used herein, "without significantly mixing" means that a measurable temperature gradient exists from the top to the bottom of the chilled water storage tank 120 with the presence of a thermocline, at least during some period of time of the operation cycle for the chilled water storage system, between the top and bottom of the tank 120. As used herein, "thermocline" means a relatively thin zone or layer of water having a vertical dimension of "Ht" as compared to the height of the water "Hw" in the chilled water storage tank 120, that is characterized by having a temperature variance that is greater than other zones within the chilled water storage tank 120. Note the vertical location of the thermocline within the tank 120 will vary depending on the particular point in the charging or discharging cycle. At the beginning of the charging cycle, for example, the thermocline will be closer to the bottom of the chilled water storage tank 120, with a relatively small volume of cooler water below and a relatively large volume of warmer water above. As the charging cycle progresses, the thermocline will move vertically upwards in the chilled water storage tank 120 until, at the end of the charging cycle, the thermocline will be very close to the top of the chilled water storage tank 120. The reverse is true during the discharging cycle.

The variable speed drive controller 132 may include a computer processor. By way of example and not limitation, the electrical controller may be the PUMPSMART® system provided by ITT Corporation of White Plains, N.Y. Instructions provided to the discharge pumps 128 via the variable speed drive controller 132 may be sent via wireless or wired connection and further controlled by computer 500.

Referring still to FIG. 5, in addition to providing instructions to the variable speed drive control 132 associated with the discharge pumps 128, the computer 500 may further monitor and control other elements associated with the gas turbine power generation system 100, including monitoring and control of the one or more gas turbines 104. The computer may also monitor and control the air inlet 108, as well as the monitoring information gathered from the tank temperature sensors "T" associated with the chilled water storage tank 120. As best seen in FIG. 2, tank temperature sensors "T" may be located at frequent height intervals within the chilled water storage tank 120 to measure temperatures of the water within the tank 120. The computer 500 may also be used to monitor electricity demand through a grid demand module 504. Here, the computer 500 may adjust the output of the gas turbines 104 by changing the flow of chilled water to the air inlet 108 through instructions to the variable speed drive control 132 that controls the discharge pumps 128. Computer 500 may also be used to control the chillers 116, to include the optional use of variable speed drive control 132 for chiller pumps associated with the chillers 116 when charging the chilled water storage tank 120. Although not shown in FIG. 5, additional components of a gas turbine power plant incorporating one or more embodiments described herein may also be monitored by computer 500.

Figure 6:
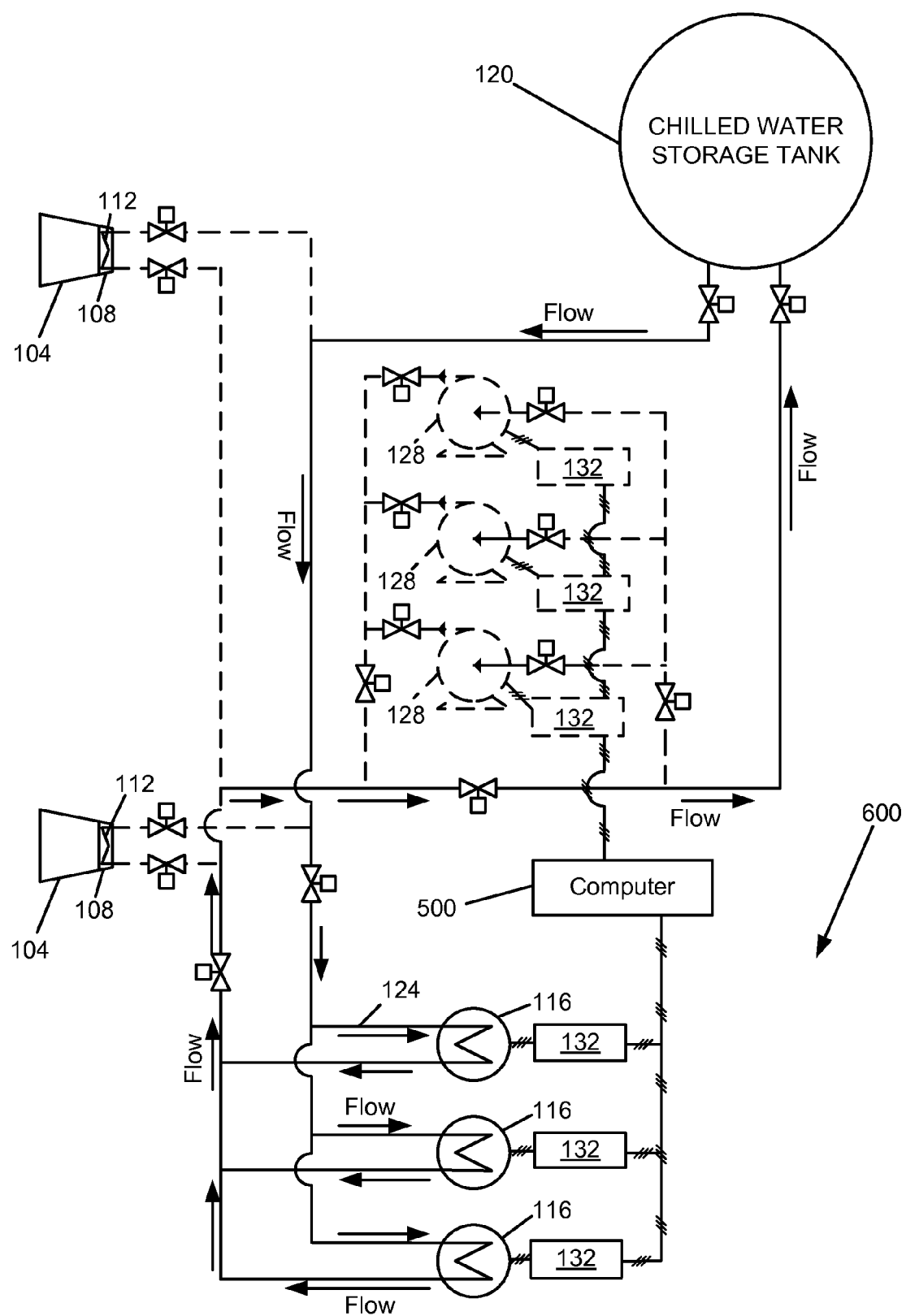
FIG. 6 is a schematic drawing that includes elements of another embodiment described herein.

Referring now to FIG. 6, in at least one embodiment a gas turbine power generation system 600 uses variable speed pump controllers 132 with the chillers 116 to mitigate disturbing the temperature profile within the chilled water storage tank 120. More specifically, while the discharge pumps 128 may be used to limit disturbance of the vertical temperature gradient within the chilled water storage tank 120 during discharging, variable speed drive pump controllers 132 can also be used to slowly start and stop the pumps associated with the chillers 116.

Figure 7:
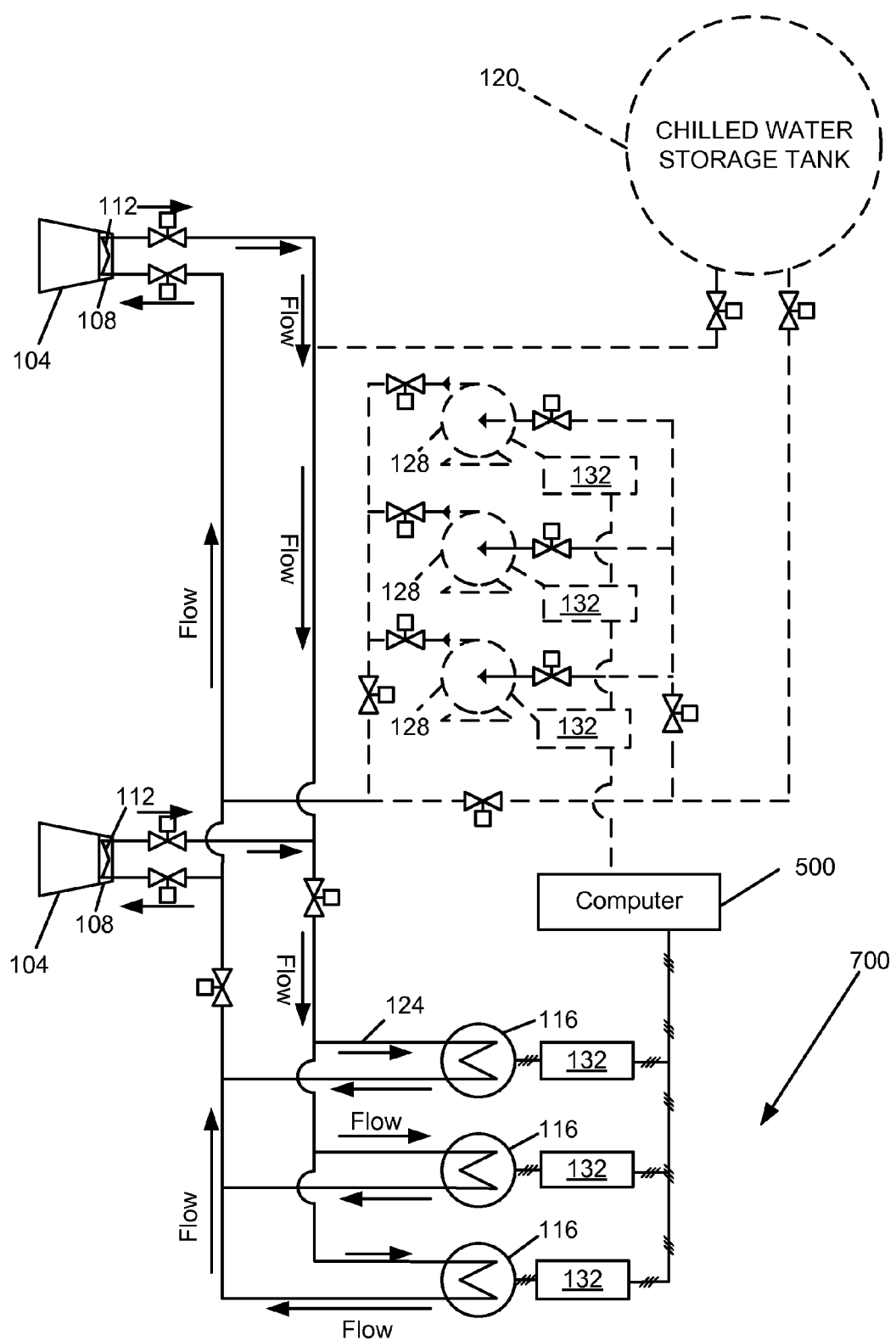
FIG. 7 is a schematic drawing that includes elements of another embodiment described herein.

Referring now to FIG. 7, in at least one embodiment a gas turbine power generation system 700 includes features in the event of maintenance to the discharge pumps 128 and/or the chilled water storage tank 120, or for any reason in which the chilled water storage tank 120 is not in use. For example, during certain times, such as certain seasons or even hours of the day, use of only the chillers 116 may be desired. For the gas turbine power generation system 700, variable speed drive pump controllers 132 can be connected to pumps associated with the chillers 116 and can be used to "tune" or adjust the output load of the gas turbines 104, as described further below.

Figure 8:
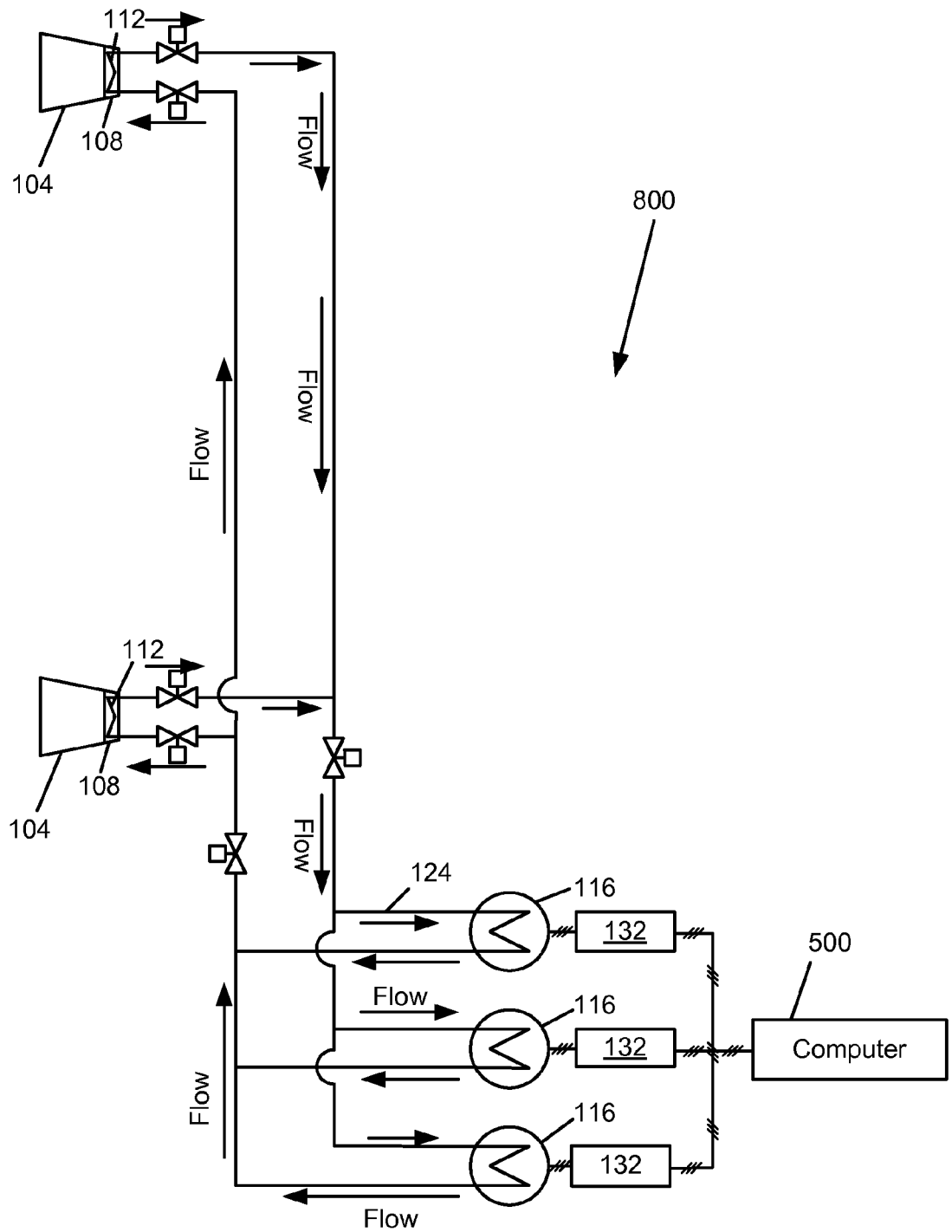
FIG. 8 is a schematic drawing that includes elements of yet another embodiment described herein.

Referring now to FIG. 8, in a separate embodiment, gas turbine power generation system 800 is shown. As can be appreciated, some facilities do not include a chilled water storage tank 120; however, they do operate with one or more chillers 116. That is, depending upon the location of a specific gas turbine facility, local/regional energy demand, physical site constraints, financial constraints, climatic conditions, and/or other factors, the operation and use of a chilled water storage tank 120 may not be feasible. However, variable speed drive pump controllers can still be used advantageously to "tune" or adjust the output of the gas turbines. As shown in FIG. 8, variable speed drive pump controllers 132 can be operably connected to pumps associated with the chillers 116, where variable speed drive pumping can be used to tune the output load of the gas turbines 104. Where a plurality of chillers 116 are used, they may be operated in parallel or in series. Other embodiments described herein may also utilize chillers 116 operated in parallel or in series, depending upon the climate and ambient conditions.

In at least one embodiment, the speed with which the discharge pumps 128 are operated is tied to the rate of temperature change at the air inlet 108 of the gas turbines 104. More particularly, the flow rate of chilled water provided by the discharge pumps 128 is adjusted to prevent a relatively quick change in the temperature of the air at the air inlet 108, thereby limiting thermal stress or combustion imbalance or instability in the gas turbines 104. Alternatively, the flow rate of chilled water provided by the discharge pumps 128 is adjusted to suit the variable load conditions. Here, the flow rate of the chilled water from the discharge pumps 128 is adjusted to accommodate the variable load conditions necessary to match the power demand. Factors involved in modifying the flow rate of the chilled water include the temperature of the chilled water being provided to the turbines 104, the temperature of the ambient air at the air inlet 108, and the load needed to meet the power demand. By changing the flow rate of the chilled water to the gas turbines 104, the efficiency of the gas turbines 104 is influenced, thereby changing the load conditions provided by the gas turbines.

Coil Leak Detection

Figure 9:
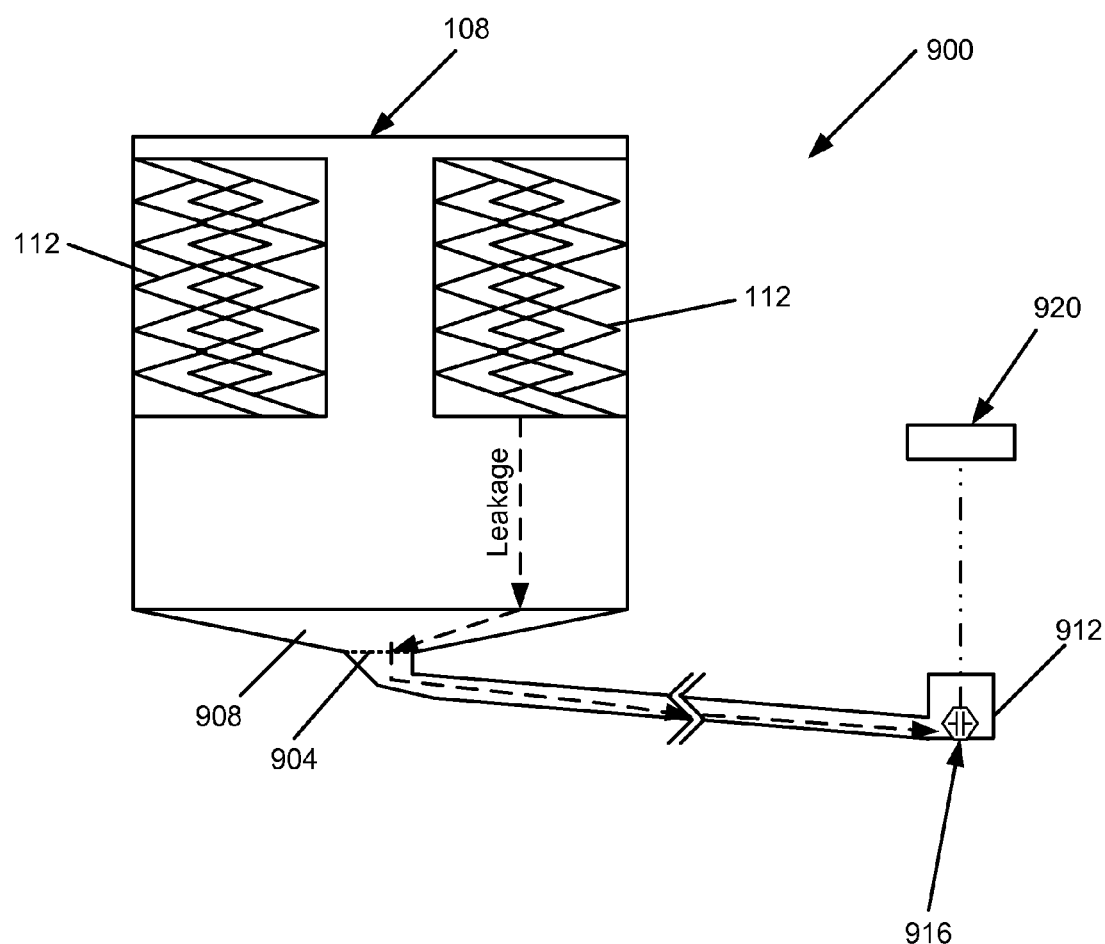
FIG. 9 is a drawing that includes elements of an embodiment of a leak detection system described herein.

Referring now to FIG. 9, in accordance with another embodiment, a leak detection system 900 is employed to detect leakage of chilled water through one or more of the coils 112. More specifically, a condensate/leakage collection drain 904 is located in fluidic communication with a condensate/leakage collection surface 908 situated below the coils 112. If the coils 112 leak, fluid from the coils 112 gravity flows from the condensate/leakage collection drain 904 to a condensate/leakage detection sump 912, wherein the fluid is sensed by a leakage detection sensor device 916. By way of example and not limitation, the leakage detection sensor 916 may comprise a device for sensing electrical conductivity associated with the chilled water that collects at the leakage collection location. Alternatively, the leakage detection sensor 916 may incorporate optical elements. One type of optics-related leak detector uses a TRASAR® Xe-2 Controller having a xenon flashlamp. The TRASAR® Xe-2 Controller is made by Nalco Company of Naperville, Ill. A leak detection controller 920 is used to communicate results of the leak detection sensing to alert facility personnel, such as by providing information to computer 500. It is to be understood that other types of leak detectors may be used in accordance with the present embodiment, including, but not limited to, other types of optical leak sensors, infrared sensors, and temperature sensors.

Water collected in the drain 904 associated with the coils 112 that is generated as condensate off of the coils 112 can be recycled within the facility. In the event that a leak is detected by leak detection controller 920 because of, for example, detection resulting from a leakage detection sensor 916 sensing electrical conductivity associated with the chilled water, and/or by using a detector to sense at least one detectable additive yielding a detectable fluorescent signal, such as a TRASAR® brand additive by Nalco Company added to the water within the chilled water system, the water can be appropriately handled and the coils 112 further investigated for a leak and repaired.

Method of Use

Figure 10:
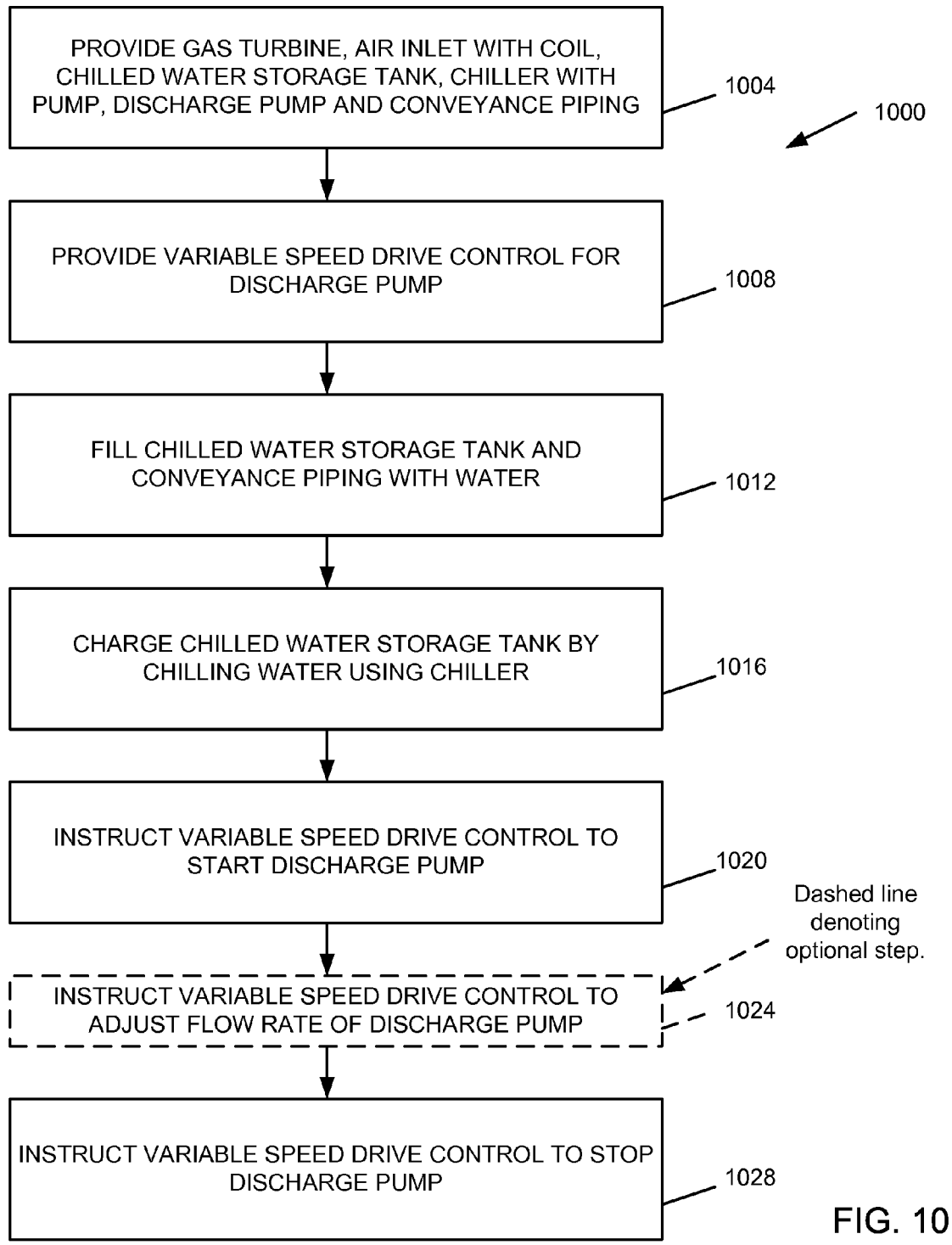
FIG. 10 is a diagram showing steps associated with an embodiment described herein.

With reference now to FIG. 10, and in accordance with at least one embodiment, a method 1000 for operating a chilled water storage system for a gas turbine power plant is provided. At step 1004, the method 1000 includes providing a gas turbine 104, an air inlet 108 with coil 112, a chilled water storage tank 120, a chiller (with pump) 116, a discharge pump 128 and conveyance piping 124. At step 1008, the method 1000 further includes providing a variable speed drive control 132 for the discharge pump 128. At step 1012, the chilled water storage tank 120 and the conveyance piping 124 are filled with water. At step 1016, relatively warm water is pumped from the chilled water storage tank 120 to the chiller 116, with cold water then pumped back to the chilled water storage tank 120. At step 1020, the variable speed drive control 132 is instructed to slowly start the discharge pump 128. At optional step 1024, the variable speed drive control 132 is instructed to adjust the flow rate of the discharge pump 128. Step 1024 may optionally be performed to tune the output of electrical power generated by the gas turbine 104 to match demand needs. Here, the energy stored within the chilled water storage tank 120 in the form of chilled water is metered from the chilled water storage tank 120 to the coil 112 by the variable speed drive control 132 and discharge pump 128 to achieve output/electricity generation and efficiency goals. At step 1028, the variable speed drive control 132 is instructed to stop the discharge pump 128. Steps 1016 though 1028 are typically repeated on a daily basis, and thus constitute a method within the larger method 1000.

The rate of stopping the discharge pump 128 may vary from the rate of starting the discharge pump 128. Not all of the steps above are necessarily required. For example, the method may not include step 1024 for adjusting the flow rate of the discharge pump 128 because the output of the gas turbine 104 may not need to be tuned.

Other steps for one or more method embodiments may include instructing variable speed drive control 132 associated with the chillers 116, wherein such instructions could pertain to flow rates associated with filling the chilled water storage tank 120 or instructions for flow rates for the chillers 116 to directly provide the coils 112 with chilled water at different rates to influence the output of the gas turbine 104.

Yet additional and/or alternate steps to one or more method embodiments may include monitoring of the leakage detection sensor 916 associated with detection of water leakage from the coils 112.

Example

A gas turbine facility with an approximately 4,000,000 gallon chilled water storage tank utilizes multiple 125 hp centrifugal discharge pumps controlled by PUMPSMART® brand electrical controls to achieve variable speed drive control of the discharge pumps. The discharge pumps are engaged at an initial slow speed and increased with time, thereby mitigating mixing of water within the chilled water storage tank. The insulated above-ground 4,000,000 gallon chilled water storage tank was approximately 64 feet tall with an inside diameter of approximately 105 feet. The operating height of water Hw in the chilled water storage tank varied between about 62.5 feet and 63.5 feet, with the height variance being attributable to changes in the height of water within the chilled water storage tank when transitioning between the recharge and discharge modes. A thermocline having a vertical height Ht of approximately 4 to 6 ft is present within the insulated above-ground 4,000,000 gallon chilled water storage tank during at least portions of the discharge cycle. Diffuser piping provides laminar flow with Reynold's Numbers of approximately 2634 for an inner ring of the diffuser piping and approximately 1521 for an outer ring of the diffuser piping. Under typical conditions, two discharge pumps operate at a combined flow rate of approximately 11,000 gpm when providing chilled water to the coils at air inlets associated with two MITSUBISHI brand, 'F' Class natural gas tired combustion turbine/generators. A leakage detection system is used to monitor whether the coils have leaked chilled water. The leakage detection system includes a TRASAR® Xe-2 Controller for sensing TRASAR® brand additive within the water used in the chilled water system.

Although embodiments herein have been described as using water, a different liquid with appropriate characteristics other than water may be used. As those skilled in the art will appreciate, secondary containment and/or double-walled piping with appropriate monitoring may be required depending upon the liquid used.

Various values described in this document are exemplary and are not intended to be limiting. Other values (and/or ranges of values) different than those described herein may be appropriate under a given set of conditions, and are considered to be encompassed by the scope of the one or more present inventions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The one or more present inventions, in various embodiments, include components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, includes providing devices and processes in the absence of items not depicted and/or described herein or in various embodiments hereof, including in the absence of such items as may have been used in previous devices or processes (e.g., for improving performance, achieving ease and/or reducing cost of implementation).

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention (e.g., as may be within the skill and knowledge of those in the art, after understanding the present disclosure). It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for maintaining a thermocline within a chilled water storage tank of a gas turbine electrical generation plant, the method comprising:
   providing said chilled water storage tank with temperature sensors;
   monitoring with a computer information gathered from said chilled water storage tank temperature sensors;
   discharging cold water from the chilled water storage tank using a discharge pump controlled by a first variable speed drive control using said information gathered from said chilled water storage tank temperature sensors;
   wherein the cold water is pumped by the discharge pump to a coil within an air inlet of a gas turbine.

2. The method of claim 1, further comprising using the first variable speed drive control to adjust a flow rate of the cold water to the gas turbine to control an electrical power output of the gas turbine.

3. The method of claim 1, wherein the first variable speed drive control starts the discharge pump.

4. The method of claim 1, wherein the first variable speed drive control stops the discharge pump, and wherein a rate of starting the discharge pump is equal to a rate of stopping the discharge pump.

5. The method of claim 1, further comprising using a second variable speed drive control to start a chiller pump for pumping chilled water from a chiller to the chilled water storage tank.

6. The method of claim 5, wherein the second variable speed drive control stops the chiller pump from pumping chilled water to the chilled water storage tank from the chiller, and wherein a rate of starting the chiller pump is equal to a rate of stopping the chiller pump.

7. The method of claim 1, further comprising monitoring for leakage from the coil using a sensor for optically detecting a detectable fluorescent signal.

8. The method of claim 1 wherein the first variable speed drive control slowly starts the discharge pump over a period of 15 seconds.

9. The method of claim 1 wherein the first variable speed drive control slowly stops the discharge pump over a period of 15 seconds.

10. The method of claim 5 wherein second variable speed drive control slowly starts the chiller pump over a period of 15 seconds.

11. The method of claim 5 wherein second variable speed drive control slowly stops the chiller pump over a period of 15 seconds.

12. The method of claim 1 wherein the first variable speed drive control is adjusted based on temperature of the chilled water being provided to the turbines to prevent a quick change in temperature of air at the air inlet of the gas turbine, thereby limiting thermal stress, combustion imbalance, or instability in the gas turbine.

13. The method of claim 2 wherein the first variable speed drive control is adjusted based on temperature of the cold water from the chilled water storage tank, temperature of ambient air provided to the turbines, and load needed to meet power demand.

14. A system for generating power, comprising:
   at least one gas turbine having an air inlet, the air inlet including a coil for holding a liquid being pumped through the coil;

a chilled liquid storage tank for holding a volume of the liquid, the chilled liquid storage tank interconnected to the coil by piping, wherein the chilled liquid storage tank comprises temperature sensors;

at least one discharge pump for pumping at least some of the liquid, the at least one discharge pump situated hydraulically between the chilled liquid storage tank and the coil; and a first variable speed drive controller for driving the at least one discharge pump, wherein the system is configured to:

monitor the information gathered from said chilled liquid storage tank temperature sensors with a computer;

discharge liquid from the chilled liquid storage tank using the at least one discharge pump and using said information gathered from said chilled liquid storage tank temperature sensors;

and maintain a thermocline in the chilled liquid storage tank.

15. The system for generating power of claim 14 further comprising a chiller, a chiller pump, and a second variable speed drive control driving the chiller pump for pumping chilled water from a chiller to the chilled water storage tank.

16. The system for generating power of claim 15 wherein the second variable speed drive control slowly starts the chiller pump over a period of 15 seconds.

17. The system for generating power of claim 14 further comprising a sensor for optically detecting a detectable fluorescent signal for monitoring for leakage from the coil.

18. The system for generating power of claim 14 wherein the variable speed drive controller slowly starts the at least one discharge pump over a period of 15 seconds.

19. The system for generating power of claim 14 wherein the variable speed drive controller is programmed to control the at least one discharge pump to adjust a flow rate of the liquid to the gas turbine to control an electric power outlet of the gas turbine.

20. The system for generating power of claim 14 wherein the variable speed drive controller is programmed to control the at least one discharge pump based on temperature of the chilled water being provided to the turbines to prevent a quick change in temperature of air at the air inlet of the gas turbine, thereby limiting thermal stress, combustion imbalance, or instability in the gas turbine.

\* \* \* \* \*